(12) United States Patent
Herberger et al.

(10) Patent No.: US 10,762,533 B2
(45) Date of Patent: Sep. 1, 2020

(54) SYSTEM AND METHOD FOR EFFECTIVE MONETIZATION OF PRODUCT MARKETING IN SOFTWARE APPLICATIONS VIA AUDIO MONITORING

(71) Applicant: MAGIX AG, Berlin (DE)

(72) Inventors: Tilman Herberger, Dresden (DE); Titus Tost, Dresden (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 885 days.

(21) Appl. No.: 14/869,593

(22) Filed: Sep. 29, 2015

(65) Prior Publication Data

US 2016/0092926 A1 Mar. 31, 2016

Related U.S. Application Data

(60) Provisional application No. 62/056,725, filed on Sep. 29, 2014.

(51) Int. Cl.
*G06Q 30/02* (2012.01)

(52) U.S. Cl.
CPC ..... *G06Q 30/0267* (2013.01); *G06Q 30/0261* (2013.01)

(58) Field of Classification Search
CPC .................. G06Q 30/0267; G06Q 30/0261
USPC ......... 705/14.64, 14.57; 455/426.1; 709/219; 381/56; 725/54, 14; 700/94; 715/753
See application file for complete search history.

(56) References Cited

U.S. PATENT DOCUMENTS

| 2011/0041154 A1* | 2/2011 | Olson | G06F 16/7834 |
| | | | 725/54 |
| 2011/0173072 A1* | 7/2011 | Ross | G06Q 30/02 |
| | | | 705/14.57 |
| 2012/0317240 A1* | 12/2012 | Wang | G06F 16/95 |
| | | | 709/219 |

(Continued)

FOREIGN PATENT DOCUMENTS

DE 4305481 A1 * 9/1993 ............ H04M 11/06

OTHER PUBLICATIONS

Gabe Donnini, Marketing Metrics & Monetization Tactics for the Application Age, 2012 (Year: 2012).*

*Primary Examiner* — Tarek Elchanti
(74) *Attorney, Agent, or Firm* — Fellers, Snider, Blankenship, Bailey & Tippens, P.C.; Terry L. Watt

(57) ABSTRACT

According to a preferred aspect of the instant invention, there is provided a system for effective monetization of product marketing in software applications by monitoring audio content preferably on mobile devices. A developer of applications for mobile devices is provided with the ability to integrate the system into the application. The audio content is analyzed, recognized and send to a server, on which data associated with the current product marketing campaign and related to the detected data is selected and send to the application, on which the data is automatically integrated into a plurality of different product marketing capabilities for example the provision of a quiz, or of advertisement graphics requesting interaction from the consumer. The data from that interaction is send back to the server wherein it is further processed and analyzed. Additionally the consumer receives a defined value providing an incentive to participate.

18 Claims, 5 Drawing Sheets

(56) References Cited

U.S. PATENT DOCUMENTS

| | | | |
|---|---|---|---|
| 2013/0160038 A1* | 6/2013 | Slaney | G06F 16/7834 |
| | | | 725/14 |
| 2014/0089815 A1* | 3/2014 | Gildfind | H04N 21/42203 |
| | | | 715/753 |
| 2014/0114455 A1* | 4/2014 | Larsen | H04H 60/375 |
| | | | 700/94 |
| 2014/0161263 A1* | 6/2014 | Koishida | G06F 16/683 |
| | | | 381/56 |
| 2014/0274031 A1* | 9/2014 | Menendez | H04W 52/0209 |
| | | | 455/426.1 |

* cited by examiner

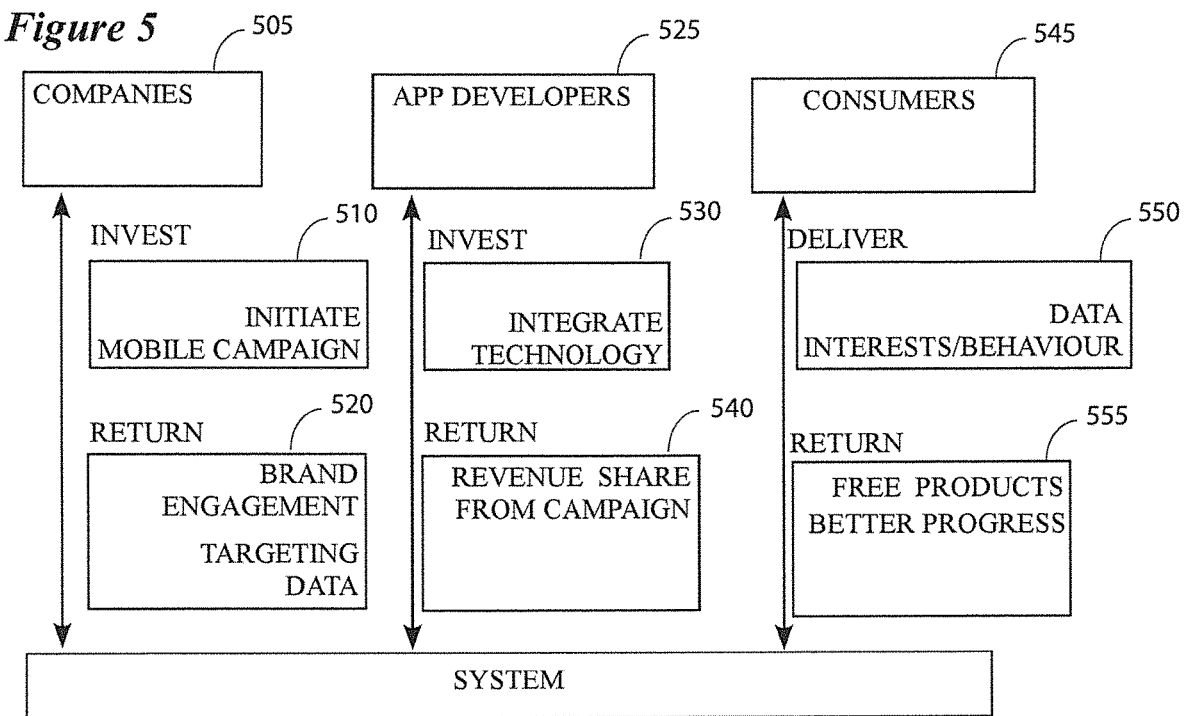
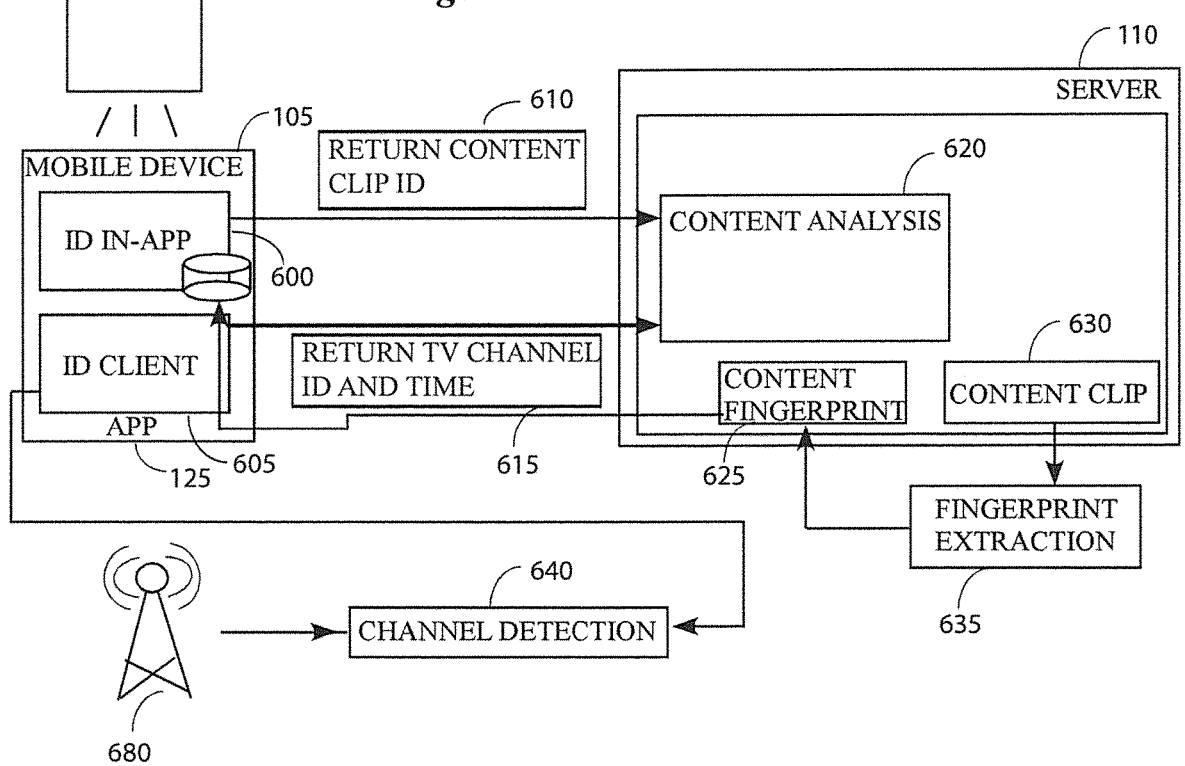

SYSTEM AND METHOD FOR EFFECTIVE MONETIZATION OF PRODUCT MARKETING IN SOFTWARE APPLICATIONS VIA AUDIO MONITORING

This application claims the benefit of U.S. Provisional Patent Application Ser. No. 62/056,725 filed on Sep. 29, 2014 and incorporates said provisional application by reference into this document as if fully set out at this point.

FIELD OF THE INVENTION

The present invention relates generally to the field of multimedia processing and, more generally, to analyzing media streams in a mobile environment to interactively provide new product marketing opportunities for effective monetization and increased customer reach and awareness.

Product marketing and advertising are intertwined approaches helping companies convince customers to buy particular products. The conventional, traditional and most accepted way to do product marketing has been and still is advertising in newspapers, magazines, television and radio. Product marketing and raising product awareness, however, is not only done with advertising, a number of different approaches have been utilized by companies with a goal of accessing and commercializing different avenues of contacting the consumer. Closely connected to this all access approach is the goal of not overexposing the message to the consumer which could potentially risk a negative effect in product awareness and standing.

With the rising distribution and technological advancements of the mobile devices the focus of product marketing has naturally moved to that particular sector. Primarily as an extension of the conventional, known marketing strategies, the traditional methods of product marketing were transported to the mobile devices. Smart phones and tablet devices and the Internet browsing functionality on these devices provided the perfect opportunity to transfer this form of advertising to the mobile devices easily. However browsing the Internet is not the activity that is most common on mobile devices. Apart from making phone calls with smart phones, texting applications and games have experienced a steady increase in terms of usage time on the mobile devices. From the extended range of functionalities of a mobile device playing games has the highest value in terms of continuously spending time on mobile devices. Therefore this part of the long temporal interaction with mobile devices is of great interest to companies for product marketing.

A number of applications on mobile devices present advertisements to consumers; however the method for presenting these ads to the consumer is to use an application that might have been activated for another purpose (e.g., ads that are presented through the mobile device browser or some other resident application). Mobile device gaming is largely free of marketing pitches, if for no other reason than that the consumer does not appreciate interruptions in the access to games and other real-time applications.

A substantial number of users of mobile devices constantly spend large amounts of time with these devices, which additionally reduces their exposure to other media that might have ads associated with it. For example, many users of mobile devices use these devices while the TV is running and that is especially true during commercial messages. Such a usage scenario provides problems to the companies interested in product marketing because the attention rate of the consumer to the material on the TV is very low and, thus, the efficacy of their product marketing strategy is challenged.

Because of a lack of feedback regarding the efficacy of product marketing on mobile devices it is not very appealing for companies to go beyond the internet browsing based marketing. Additionally it is not very appealing to developers of applications to integrate some sort of product marketing into their applications, because the potential income due to application based product marketing is countered by the potential bad sales due to the fact that consumers do not like the interruptions of their experience with the application and additionally because no positive incentives for the consumer are connected with product marketing on mobile devices.

These sorts of problems has discouraged application developers and companies from developing and initiating or participating in product marketing in the sector of applications on mobile devices apart from the known internet based marketing approaches, which represent the simple transference of the old and well known product marketing approaches to the mobile sector and do not represent a specific product marketing approach tailored especially to functionalities of mobile devices.

Thus, what is needed is a system and method for developers, companies and consumers that is easily integrated into applications for mobile devices, that monitors, analyzes and recognizes a plurality of incoming audio streams, that provides a plurality of selectable and adjustable matching product marketing capabilities based on that recognition, a system and method that provides easy monitoring and evaluation by both developer and companies, a system and method that provides the integrated product marketing capabilities in such a way that the consumer is provided with a positive incentive when participating in the product marketing capabilities.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for effective monetization of product marketing in software applications by monitoring audio content and providing this functionality to a plurality of parties enclosing developers, companies and customers and additionally providing all these parties incentives to implement the instant invention.

In one embodiment the instant invention will provide a developer of mobile applications with the ability to integrate product marketing capabilities into their applications. The product marketing capabilities monitor media audio data and analyze this data for recognition on mobile devices and, based on the media items identified, provide to the consumer ads that are relevant to those items. The developer will be able to integrate a number of different product marketing capabilities into an application for example in form of a quiz, or of a video or advertisement graphics provided with data associated with monitored and analyzed content or provided by the companies.

The monitoring functionality will be integrated by the developer into the application and once activated audio material that is audible in the vicinity of the mobile device will be monitored. The monitored audio material will then be analyzed by the instant invention and identified. This information will then be provided to the marketer who will then be able to provide targeted ads to the mobile device. In a preferred embodiment the instant invention will feature a system architecture comprising a client-server type, wherein the mobile device represents the client device sending out analysis results and receiving instructions and wherein the server is receiving the analysis results and sends instructions and data for implementing the product marketing capabilities to the mobile device.

The content provided and distributed by the product marketing capabilities is associated with the detected and recognized content from the audio stream. Therewith the instant invention allows the marketer to initiate coordinated product marketing campaigns on a number of different distribution channels. Furthermore with the specific way of integrating the product marketing capabilities and the interaction with the product marketing approach within the application the consumer also potentially benefits, depending on the implementation by the developer. The benefits for the consumer might be, for example, progress in the application or similar application specific reward systems.

In an embodiment the instant invention will operate in two different ways. Both approaches have the client-server architecture in common. The primary difference between the two approaches lies in where the audio identification is carried out. In the first approach audio material captured by a microphone within the user's mobile device will be analyzed and identified within the mobile device by calculating a fingerprint of the audio and comparing it with precalculated fingerprint values stored in a database on the mobile device. As described further below, the material target audio might be the audio portion of a video that relates to a specific product marketing campaign. After successful identification, this information is sent to a remote server a where a message and a possible reward are stored that are associated with the associated product, wherein the server selects and transmits data back to the client, wherein this data is part of the product marketing campaign and specifically prepared for the mobile device and the instant system as it is integrated into the application on the mobile device.

In a second approach the mobile device constantly transmits calculated data values of the incoming audio stream to the server, where the identification step is performed. Afterwards, the results and the instruction data are transmitted back to the user's mobile device for the further interaction with the consumer.

According to another embodiment, there is provided a method of transmitting targeted messages to a user of a mobile computing device such as a cell phone. In this embodiment, a host application will be created that has a primary functionality, where "primary" means functionality different from audio recognition and user interactive. Additionally, the host program will have secondary functionality that operates according to the methods described above. More particularly, in this embodiment the user will be provided with a host application that is intended to be interactively used for its primary functionality (e.g., email, FaceBook, Internet browsing, interactive gaming, etc.) but which, without specific direction from the user, will monitor audio sources for specific content and, upon identification of such content, will provide the user will a message of some sort which will preferably be associated with the identified content. Additionally, the user may be presented with a reward which can be utilized as part of the primary functionality of the device.

With both approaches the instant invention addresses possible bandwidth problems, the first approach only needing a minimal data connection since it does not generate much data traffic. This might be useful in situations where the consumer is restricted in terms of data usage amount. The continuous detection and calculation of data values would be useful in situations where the instant system is intended to monitor a continuous media stream. In this case the necessary traffic amount is high due to the continuous transmission of calculated data values to the server and the transmission of detection results from the server back to the mobile device.

The whole process of detection and identification that is represented as a part of the application of the mobile device can be integrated into the application by the developer invisible to the user. The user interaction is preferably started after the server transmits the resulting data back to the mobile device and after having received the identification information from the client mobile device and matching it with the data stored in the server.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 5 illustrates the parties utilizing the instant invention and their input into the system and the advantages of the system for the parties.

FIG. 6 depicts the preferred environment of the instant invention showing the versatility on the client side and the functionality on the server side.

DESCRIPTION OF THE PREFERRED EMBODIMENTS

Figure 1:
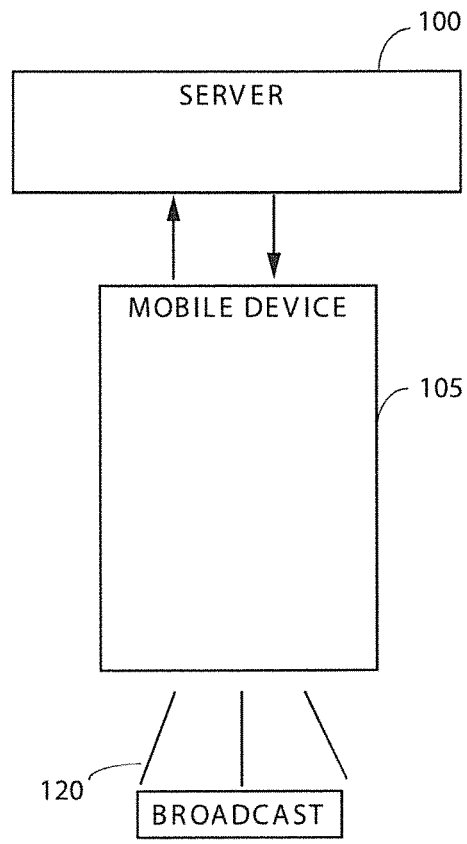
FIG. 1 illustrates the preferred working environment of the instant invention.

Referring now to the drawings, wherein like reference numerals indicate the same parts throughout the several views, there is provided a preferred system and method for implementing theme basted video creation with real-time effects.

As is generally indicated in FIG. 1, the architecture of one embodiment consists of two main components. The first component is a server 100 and the second component is the mobile device 105. This sort of arrangement is often characterized as a client-server architecture. The mobile device, the client, works as an intermediary between the broadcasting station 680 and the server, wherein instructions from the server control the activity of the instant invention on the client device. The mobile device receives and processes the data from the broadcasting station 680 and sends the processed data to the server, which interprets the received data and sends instructions and data back to the client device.

Figure 2:
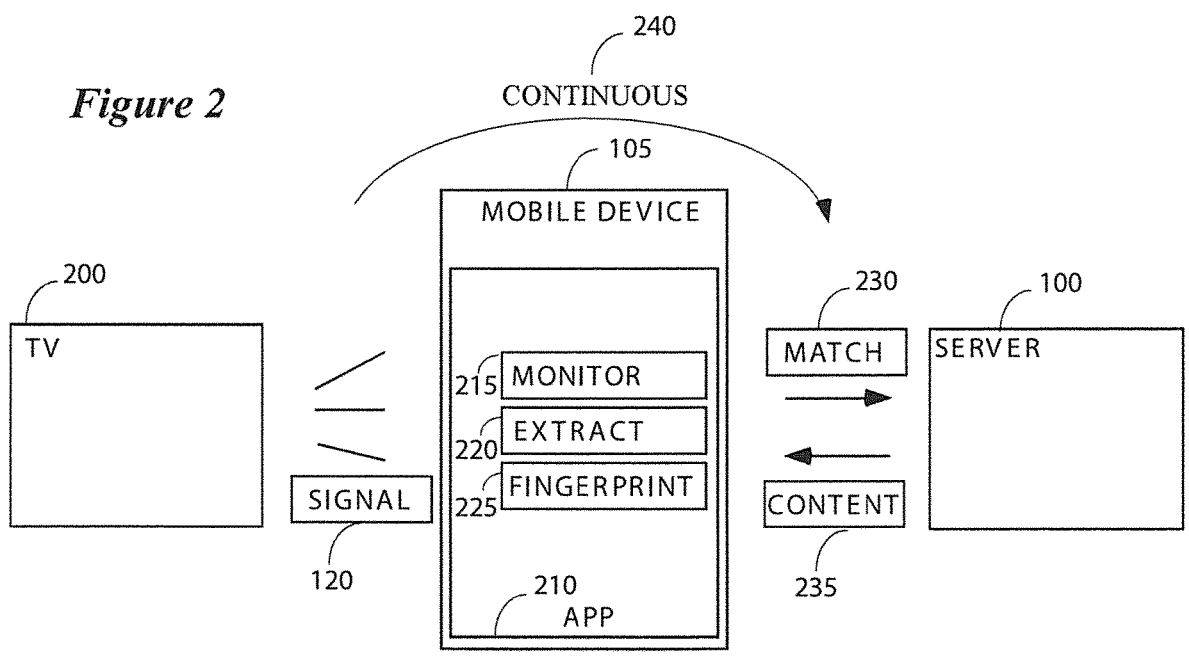
FIG. 2 depicts the continuous monitoring approach of the instant invention with the identification process taking part on the server device.

Turning next to FIG. 2, this figure shows the continuous monitoring approach of an embodiment with the identification process taking part on the server device. Additionally in this figure the TV 200 is used as a placeholder for the broadcasting station 680, which might be any kind of audio stream emitting source (e.g., an AM or FM radio, Internet streaming, a live concert, etc.). For purposes of this disclosure, the term "audio emitting source" should be understood to mean any device that emits audible signals using a conventional or unconventional speaker of some sort.

The processes that drive the steps of this embodiment 240 take place continuously. The broadcasting station 680 emits a signal 120—in case of a TV it might be a combined stream of video and audio material. However, for purposes of this embodiment, only the audio portion will be considered. On the mobile device 105 the consumer will utilize an application into which the developer of the application has integrated an embodiment, making the system of the instant invention a part of the application stored on the mobile device. The system as part of the application runs continuously and monitors 215 the audio environment of the mobile device, extracting audio content from the environment 220 and generating a constant ongoing number of fingerprints 225 from the extracted data. These processes will all be executed without any visible notification to the consumer who is interacting with the application according to the functionality provided by that application.

The fingerprints will preferably be sent to the server 100, where the received fingerprints will be compared with stored fingerprints in a database. When a match 230 is detected the server will select content 235 that has been associated with the audio stream and that corresponds to the calculated fingerprint and provide that content to the mobile device where it is stored and integrated into the operation of the application according to the definition of the developer.

Figure 3:
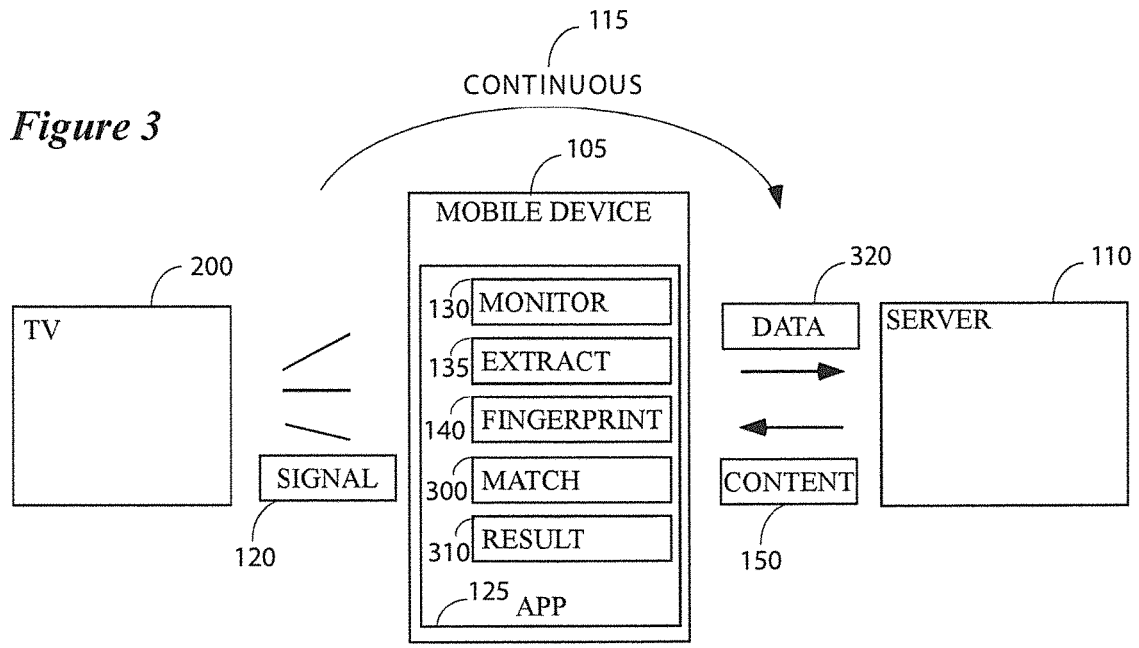
FIG. 3 illustrates the continuous monitoring approach of the instant invention with the identification process taking part on the client device.

Turning next to FIG. 3, this figure illustrates an embodiment of the continuous monitoring approach of the instant invention with the identification process taking part on the client device. This figure shows the same parts of the process of the instant invention as FIG. 2, the TV 200 is broadcasting a signal 120; preferably a video signal combined with audio material. The audio portion of this signal will be detected by a microphone of the device (not shown in FIG. 3) and read/processed by an application 125 that has integrated therein an embodiment of the instant invention]. The application 125 will be stored and running on the mobile device 105. The instant invention will have been integrated into the application by the developer and it will operate invisible to the consumer and without interfering with the inherent functionality of the application.

In operation, the incoming audio stream from the microphone will be continuously monitored 130 and an extraction of the digital audio data will be performed, with the individual sections 135 being used to calculate a fingerprint 140. In some embodiments, each section might be a few seconds long, tens of second long, etc. In some cases the sections might overlap each other by some amount. Those of ordinary skill in the art will recognize how such windows might be chosen and utilized in practice.

In a next step a fingerprint will be calculated for the current audio section and the extracted fingerprint will be compared to audio fingerprints stored in a database that is, in this embodiment, resident on the mobile device. If a match 300 is detected, that result 310 will be transmitted to the server 110 as part of a data package from the client device.

The data package in this embodiment will contain information that includes, for example the ID of the detected material, the time of the detection, a user or device ID, and channel number if the audio stream is from a TV broadcast, wherein this information is received and stored in the server 110. In the server the transmitted data will be analyzed and, based on that analysis, content 150 will be selected and sent to the mobile device. This content is preferably picked and provided by the marketers and associated with a product marketing approach and integrated into the application as defined by the developer.

Figure 4:
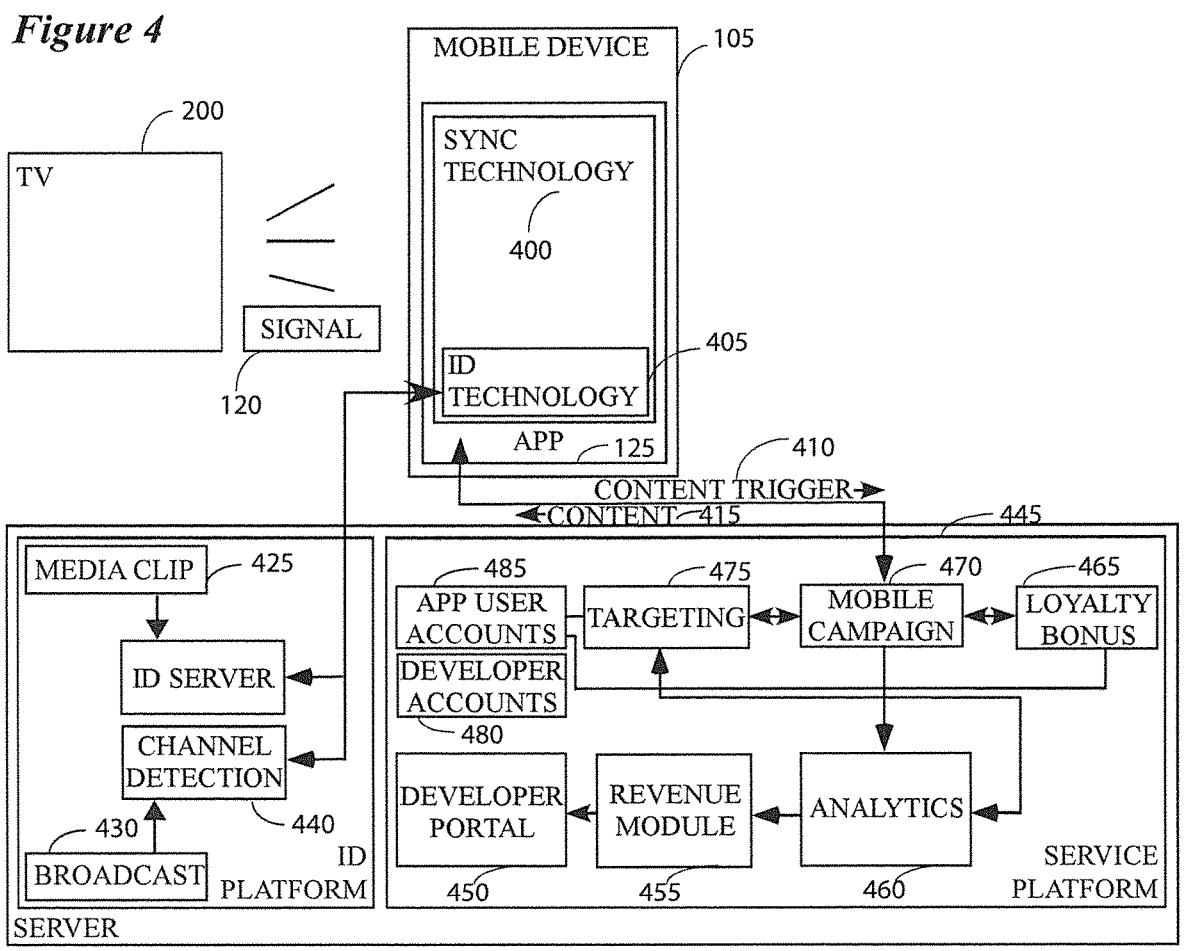
FIG. 4 depicts the architecture of the instant invention.

Turning next to FIG. 4, this figure depicts an embodiment of a setup of the instant invention including the principal components that comprise the architecture. Some components have been depicted in previous figures, e.g., the server 110, the mobile device 105 and the television 100, wherein the television is a placeholder for every media emitting source, which is potentially able to transmit audio signals 120.

This embodiment provides the application developer the option to integrate the functionality of the instant invention as an addition into an application 125 running on mobile devices. On the mobile device, as part of the application, the instant invention comprises a sync technology 400 and an ID technology 405.

The sync technology is responsible for providing the received data from the server to the application and therewith the consumer and the ID technology is responsible for receiving and analyzing the incoming data and furthermore for sending the data to the server for further processing. The server platform contains a number of different modules and sections, differentiated into two distinct platforms, an identification platform 420 and a service platform 445. Both of these platforms will communicate with the mobile device in both directions which could be done via WiFi, cellular signal, etc.

The identification platform 420 will be able to handle multiple forms of identification of incoming media. If the identification is based on individual clips 425, the identification data value will be stored in an ID server 435 and if the identification is based on the continuous monitoring of a broadcast 430 channel detection 440 functionality will be utilized. The channel detection will be able to identify individual broadcast channels based on the identification data value provided to the server from the mobile device. The identification platform will be able to communicate with the mobile device in two forms, first continuously sending identification data and receiving identification data values to and from the mobile device and second by sending requested identification data back to the mobile device after receiving individual identification data values from the mobile device.

The service platform will be an accessible platform for the developer and the consumer containing and managing the data transmission actions of the instant invention that are connected with consumer activities and transmission of matching content back to the consumer. The consumer and the developer communicate with the service platform, wherein the developer is provided with more detailed options to communicate with the service platform. The consumer can generate a user account 485 from within the application, wherein the user accounts are stored in the service platform. The developer can also generate and manage individual accounts 480 on the service platform. A purpose of the service platform is to manage the distribution of matching content to the mobile devices and additionally manage potential incentives for the consumer when participating and additionally also giving the developer an interface to easily manage and analyze the amount of data that is generated by distributing content to the consumer.

Continuing with the example of FIG. 4, the mobile device will send a content trigger 410 to the service platform which then analyses the incoming trigger. Based on data regarding the current marketing campaign on mobile devices of the marketer and with consideration of specific targeting data 475 and a potential loyalty bonus 465 the service platform sends content 415 back to the mobile device. The targeting 475 section on the service platform is connected to the section storing data concerning the mobile campaign and also connected to the application user accounts to therewith ensure that the content sent to the consumer is fitting. The section regarding the loyalty bonus will also be connected to the data concerning the mobile campaign and the targeting section and the application user account section. In this embodiment, this program section will be concerned with providing the positive incentives and rewards to the consumer, thereby motivating the consumer to participate in the interactions provided by the instant invention. The developer portal 450, the revenue module 455 and the analytics section 460 of the service platform are designed to be utilized for access by both the developer and the marketer.

Via the developer portal the developer will be able to access the service platform on a more comprehensive level, accessing the revenue module which preferably contains information about the amount of distributed content and the therewith associated amount of revenue the developer can expect. The analytics section stores and analyzes most of the incoming data and provides it to the consumer and also the marketer to more directly evaluate the distribution of content connected with a mobile campaign initiated by the marketer.

Turning next to FIG. 5, this embodiment depicts the participating parties in an embodiment and the input from these parties and further illustrates the advantages and incentives for the parties to utilize and implement the instant invention. According to this variation, all participating parties will potentially profit from using the instant invention, marketers 505 looking for new ways to do more efficient product marketing campaigns and also looking for new potential target sections, developers 525 of applications on mobile devices are also interested in new ways of monetizing the distribution of their applications and consumers 545 are also a participant in the invention as users of the applications into which the invention has been integrated.

All of the aforementioned participants will be expected to invest when the instant invention is being implemented and used. The marketers will need to initiate a mobile product campaign 510, the app developers will need to integrate the technology of the instant invention into the application 530 and the consumer invests or supplies his or her data and interests 550 to the system 500. In return the consumer may preferably, and that decision is up to the developer, receive free products or achieve better progress in the application, clearly the options for the developer to reward the consumers are manifold. The benefit for the developer is, besides possible better sales, a share from the revenues from the product marketing campaign 540. For the marketer investing into this particular new form of product marketing the brand engagement and awareness is heightened and additionally the companies are able to distribute content more accurately because of the targeting data 520 provided.

Turning next to the embodiment of FIG. 6, this figure depicts a preferred environment showing the versatility on the client side and the functionality on the server side in terms of content preparation. The mobile device 105 will contain the host application 125, into which a component of the instant invention has been integrated. In the example contained in this figure, the instant invention will be configurable to either implement audio matching entirely on the mobile device via a local database 600 or split the process between the mobile device and the server, where the server 110 will handle the matching process 605. The first variant requires an updated and complete database on the mobile device, whereas the second variant requires a reliable and fast data connection to the server and is preferably used when the detection of individual broadcast channels 640 is desired. In this arrangement, calculated fingerprints will continuously be transmitted to the central server where they will be compared with the fingerprint database.

The detection process provides as a result either a specific ID describing a detected clip 610 or an ID representing the channel 615 that is currently being monitored and the time of the event. In the cases the channel might be identified from a knowledge of when and on what channel a particular audio clip is scheduled to run. This sort of information could be provided by the content provider so that, when an audio "hit" is registered, it will be straightforward to match that to a particular channel. In other cases, the particular TV channel might not be important to the content provider, only a determination that the user has been exposed to it.

Continuing with the current example, on the server 110 the analysis of the content also has different variants. In the case where the identification is carried out on the mobile device, the server will generate data values that describe the audio—the fingerprint extraction 635, wherein a target clip 630 is analyzed and the calculated fingerprint 625 is then transferred to the database of the mobile device. Another aspect of the server functionality will analyze the data that is transferred to the server from the mobile device, depending on the implementation of the system on the mobile device this might be data identifying individual target clips 610 or data identifying channel IDs and current and playtime 615.

Figure 7:
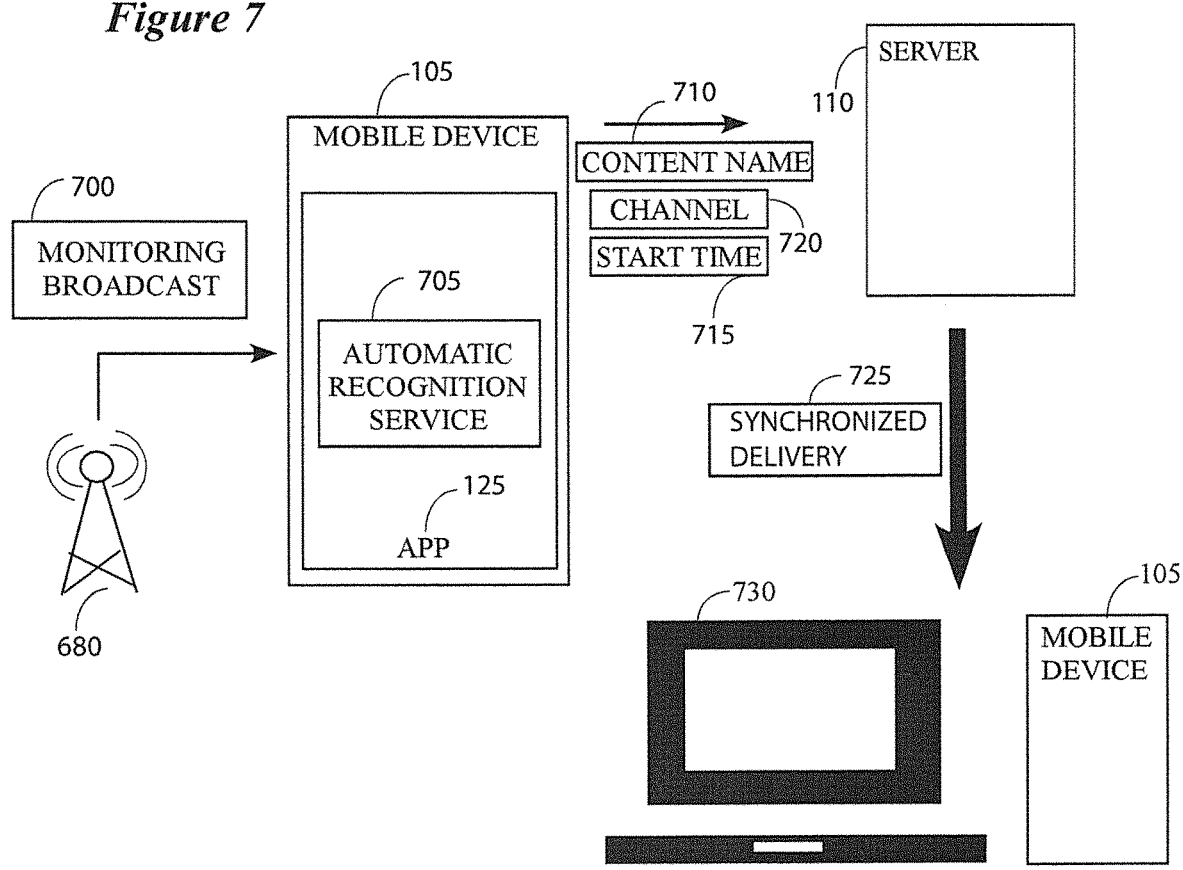
FIG. 7 illustrates another preferred embodiment of the instant invention—the synchronized delivery of product marketing data to multiple receiving devices.

Turning next to FIG. 7, this figure illustrates another embodiment of the instant invention—the synchronized delivery of product marketing data to multiple receiving devices. The mobile device 105 and the server 110 are the participants standing in connection with each other. A station will broadcast content which is received in the vicinity of a user. As has been described previously this content might be audio content only, or video content with an audio component. Either way, the instant invention will preferably monitor the audio components of the broadcast 700 via the microphone of the mobile device.

On the mobile device 105 the recognition service or secondary function of the host application, will analyze the monitored audio stream and transmits a number of different data values calculated from the audio to the server 110 including, for example, characterizing parameters such as zero crossing rate, tempo, long or short term spectral characteristics (including average spectral values), pitch, key, a listing of the instruments that are present in the audio (to the extent that such can be identified), long or short term frequency bandwidth, whether vocals are present or not, whether the audio work is music, vocals and music, or spoken words. These sorts of parameters will be used to formulate a fingerprint of the target audio either on the mobile device or the server.

Figure 8:
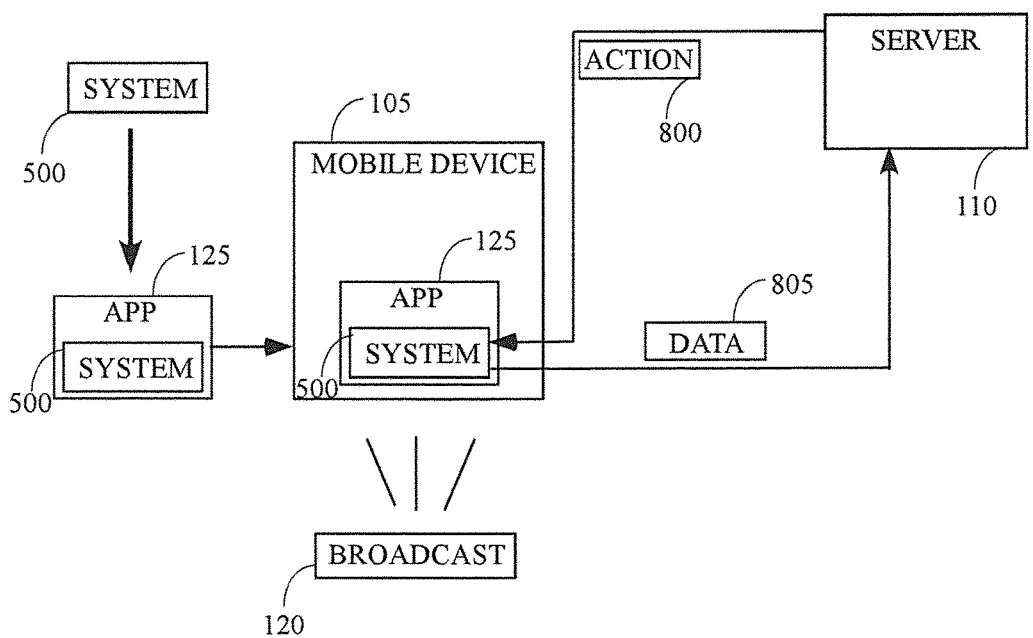
FIG. 8 depicts the preferred embodiment of the instant invention including the architecture and the participating parties.

Depending on the type of the audio stream the mobile device will transmit the name of the identified audio material 710, or the name of the identified broadcast channel 720 and the start time of the broadcast to the server 100, wherein the server receives the data and based on the values transmitted to it, the server will select associated content for transmission back to the user. That is, this content might be provided by the companies that have invested in the content that is targeted to and associated with the content of the monitored broadcast (e.g., targeted ads that are intended to match or be comparable to the subject matter of the identified broadcast). This content is then, as a preferred embodiment, synchronously transmitted 725 to a plurality of devices, for example multiple devices linked to one particular user, or multiple devices associated with a number of individual users who are all exposed to the same broadcast. There will preferably be no limitations regarding the potential recipient devices, so this figure depicts a personal computer 730 and a mobile device 105 as examples Turning next to FIG. 8, this figure depicts a preferred embodiment of the instant invention that includes the architecture and some participating parties and the interaction between them. The exemplary system 500 will be integrated into an application 125 for a mobile device 105 by the developer. The system will provide simplified procedures to use by the developer to simplify the integration. Once integrated into the application the integrated system is directed to monitor audio data from any incoming broadcast 120 during running time of the application and preferably without any visible notification to the user of the application and additionally not modifying the general functionality of the application. The monitored broadcast is, as has been described, analyzed and data 805 is transmitted from the mobile device to a server 100. In the server 100 the data is analyzed and associated stored data is then sent back to the mobile device with instructions for the initiation of a specific action 800 on the mobile device. As has been described this might be the display of advertisements, the initiation of a user interaction providing the user the opportunity to take part in some sort of audit or quiz, which afterwards provides the user rewards for example in the progress of the application.

Figure 9:
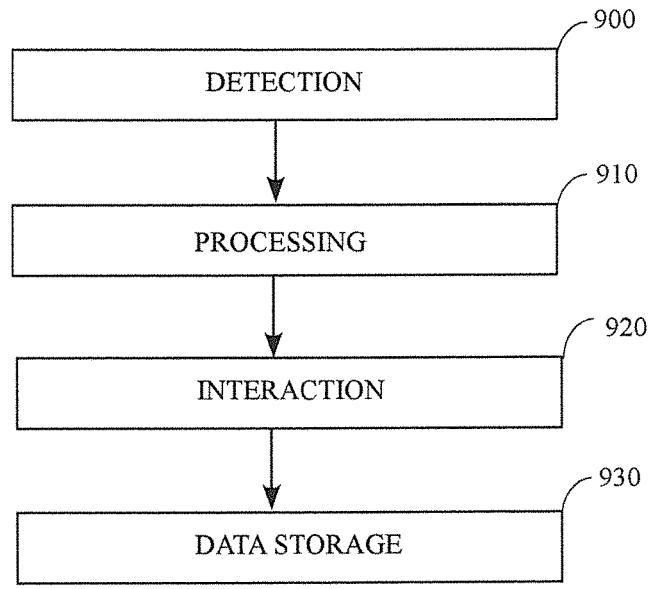
FIG. 9 illustrates a very compact representation of the workflow of the instant invention.

Now turning to the example of FIG. 9, this figure illustrates a very compact representation of the processes taking place in the workflow of the instant invention. For simplification the step of integrating the instant system into the application by the developer has been left out. The application utilizing the integrated system constantly monitors the audio input of the mobile device directed to detect 900 specific content, by analyzing the audio input. The monitored data is processed 910 by the system on the mobile device and the data is sent to a server which further analyses the data, selects associated and provided content stored in a database on the server which is then transmitted to the mobile device. On the mobile device the data is received and integrated into interaction 920 opportunities for the user, wherein these interaction opportunities are being provided to the user as part of the generic interaction with the application but generally not modifying the normal functionality of the application. As a result of that interaction the generated data is separated and data that is of interest for the marketers providing the product marketing campaign is stored 930 on the server, wherein data that is provided for the user is stored on the mobile device.

Figure 10:
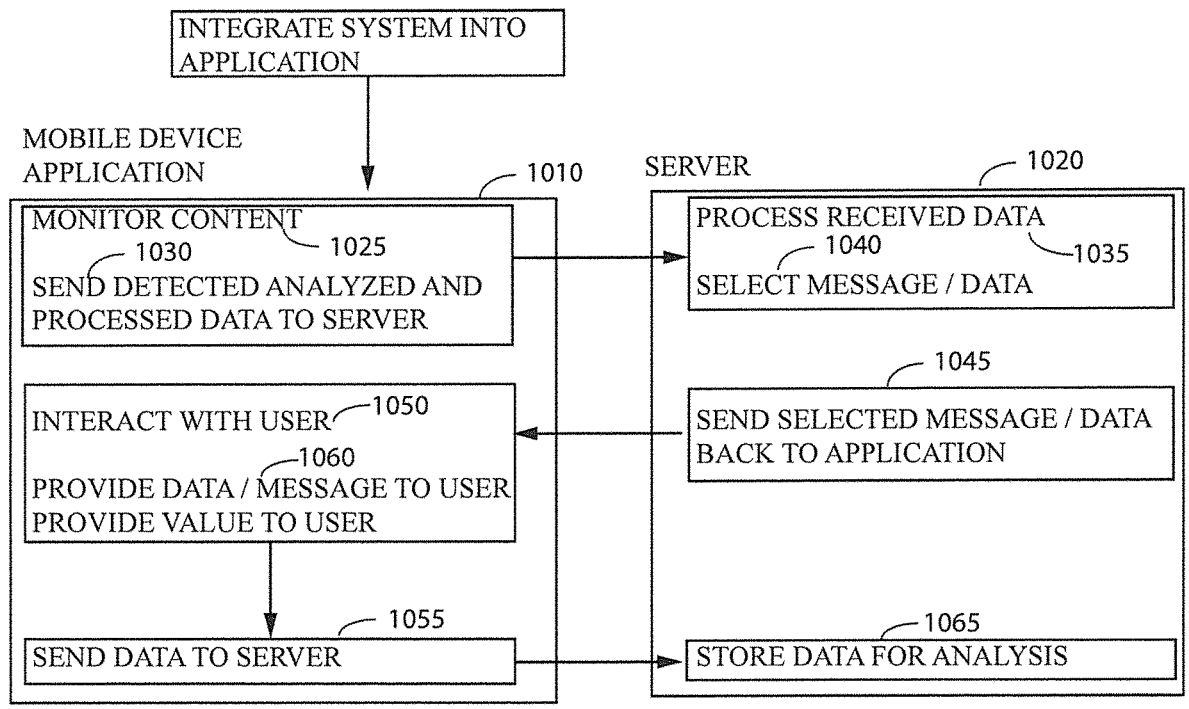
FIG. 10 depicts the preferred workflow of the instant invention.

Turning next to FIG. 10, this figure depicts a preferred workflow of an embodiment. In a first preferred step the developer will integrate the system of the instant invention into an application that is intended for downloading to a mobile device or that is already available on mobile devices. The next steps will preferably be utilized by communications between application 1010 and server 1020.

The host application on the mobile device which is utilized by the consumer according to its primary function will monitor audio content 1025 that is sensed within the vicinity of the mobile device via its secondary function. In a next preferred step the detected, analyzed and processed data will be sent 1030 to the server for further processing 1035 which is the preferred next step after receiving the data in the server. The received data will be checked, compared with the database fingerprints, associated with data or a message associated with the found target audio 1040, and the data/message will then be sent back to the application running on the mobile device 1045.

On the mobile device within the application the received data will be made a part of various interactive options 1050 that may be provided to the consumer 1060, wherein preferably these interactive options will be provided as part of the standard content of the application. The result of the interaction is two fold, first, the data received from the user as a result of the interaction will be sent back to the server 1055, where it is stored for further analysis 1065. Additionally the user may be provided with the value or reward 1060 (e.g., game tokens, online credits, etc.) as a consequence of participating in the interaction options.

According to another embodiment, there is provided a method of transmitting targeted messages to a user of a mobile computing device such as a cell phone substantially as described above but the audio recognition aspect of the invention exists as a secondary function within a host application. An exemplary model for this embodiment is that of a user who might be multitasking by utilizing the user interactive primary function of the host application while simultaneously watching television within earshot of its audio portion.

In this embodiment, a host application will be created that has a primary user interactive functionality, where "primary" means functionality different from audio recognition. Although the primary functionality might have many forms, in some embodiments it will be an application for accessing email, an Internet browser, a program to interface with FaceBook or other social media websites, a game, a news reader, etc., all of which require some sort of ongoing user interaction.

Additionally, the host program will have secondary functionality that operates according to the methods described above. More particularly, in this embodiment the host application will have a secondary audio recognition function that operates continuously and unseen in background simultaneously along with the primary function. Once activated by the user or developer, the secondary functionality will continuously monitor the microphone of the mobile device for specific audio. Upon recognition of the audio using either approach described above (i.e., whether by reference to an internal fingerprint database or transmission of the fingerprint to a remote server for identification), a central server will be contacted and, after detection of the audio is established, a message will be transmitted back to the device for presentation to the user.

Given the message, the primary function will be at least partially interrupted to display for the user the message (e.g., banner, etc.) associated with the sensed content. Note that the interruption might, generally speaking, take two forms. In a first variation, the message might be displayed as a banner which allows the primary functionality to keep operating until the user reaches a point where the message can be acknowledged by, for example, selecting an on-screen button. A second general approach would be to halt entirely the operation of the primary function and, in some cases, take over the entire screen until the user acknowledges receipt of the message or interact with the message. For purposes of the instant disclosure, the term "banner" will be used to indicate the mode by which the message is communicated to the user, whether the banner occupies only a portion of the entire screen (e.g., a top or bottom banner, a flashing on-screen button, a sound alert such as a beep, etc.) or the entirety of it, and whether the banner interrupts the primary function or merely indicates to the user that a message is ready to be viewed.

Additionally, receipt of the message might include either an immediate or delayed reward of some sort for the user. In some variations, the user may be presented with a reward that can be utilized as part of the primary functionality of the device (e.g., additional lives, money, powers, etc., where the host application is an interactive game). In other cases, the banner might provide a user with a link that takes him or her to a web site where a coupon can be printed, a predetermined commercial message can be presented in greater detail (e.g., a video related to the audio that has been identified, such a video about a car that was advertised on the television).

In some embodiments the banner will not disappear until after the user acknowledges it in some way. In other cases, it will disappear after a predetermined period of time. Either way, it may be that the user will receive a reward for interacting with the banner including, for example, game lives (if the host application is a game), a unique graphical item for posting on FaceBook® (if the host application provides access to FaceBook®), an e-mailed coupon or other reward (if the host application is an e-mail reader), etc. Of course, these are just some examples of rewards that might be provided and those of ordinary skill in the art will readily be able to devise others.

Turning now to some specific examples of how various embodiments might operate in practice, an "adsync" server will interact with a standard "adserver". An App that integrates the Tool (Software Development Kit=SDK) will be able to immediately generate advertising revenues. The Tool has great potential for the marketer as well as the App developer to link the mobile customer to large and high value advertising campaigns, mainly driven by TV as the main advertising format. This makes it possible for the App developer to sell more inventory and for the TV campaigner to extend and retarget a marketing campaign without additional effort to mobile users who are part of the chosen demographics for the TV campaign.

Various aspects of embodiments of the invention should appeal to the broadcaster:

1. The target audience of a TV campaign can also be approached through a Second Screen device (e.g., a cellular telephone) without any wasted coverage, since the only TV viewers that will be approached are those watching/listening (with their second screen running) to a certain add, to certain content in a chosen format.
2. Pure play mobile campaigns can be linked to certain TV formats.
3. Agencies and TV channels receive very accurate data on viewer behavior.
4. The adsync format can be delivered either while the user is currently viewing the relevant advertisement on the first screen (fully synchronized) or at any time when he is using the App.
5. If a brand uses TV advertisements in different countries and channels it does not need to manually align the mobile advertisement with the TV campaign. adsync will automatically deliver to the same demographic in each country in correlation to the TV campaign.
6. The adsync technology can be used to supplement, link, and synchronize TV campaigns to online marketing campaigns in a very powerful way.

Other aspects of embodiments of the invention should appeal to the application (e.g., mobile game) developer:

7. Straightforward integration with existing software applications.
8. Access to significant marketing budgets, as the mobile marketing budget is often a sub-budget of large TV campaigns.
9. The App Developers and especially the Mobile Game Developers (MGDs) can use standard mobile advertising formats or use a reward based format without re-designing their own reward systems (mobile marketing income as another currency to purchase in-app).

Simply speaking, an embodiment of the adsync service described herein enables mobile apps to interactively react to TV broadcasts or comparable acoustic situations (e.g., movie theater audio, point of sale audio, etc.) by displaying smartphone content that is matched to the currently broadcast advertisement and—if wanted—to reward the consumer within a given or newly created reward system of the App.

As is generally known, a large number of TV consumers (about half of such consumers according to some estimates) use their smartphone or other mobile computing device (e.g., table computer, etc.) while watching TV. Thus, these sorts of users form a target group for innovative advertising strategies that, among others, enable advertisers to engage with customers at a new, deeper-level and precisely measurable touch points; tap into new revenue streams for app developers; and, allow app users to acquire bonus points or valuable app items for free.

The following describes some examples of features that can be utilized by integrating the adsync with a smartphone or tablet app:

1. Banner Display Triggered by TV Commercial:

An embodiment of the adsync Tool monitors the audio channel of the TV using the mobile phone's microphone while an app (e.g. a game, FaceBook®, etc.) is running. If the adsync Tool detects that a certain commercial is being broadcast a matching advertising banner will be displayed on the smartphone that leads to further information and purchasing options if clicked on. Thus, users can easily obtain further information about advertised products while watching a TV commercial and, if such would be desired, even purchase them.

This process can be tracked precisely and thus allows for detailed reporting on the effectiveness of the clip to be provided to the advertiser. The app developer earns revenue by delivering the banners.

This service does not need to be fully synchronized. The same (advertising) effect could be achieved when the TV audience selected for a campaign (Channel/show/demographics) qualifies itself as relevant audience by watching the TV format addressed by the advertiser. Such a 'viewer' (an embodiment of the Tool will recognize the audio file) would be approached by a mobile campaign when the App is used (i.e. during the relevant advertising campaign or later).

2. Mobile Device Video Display Triggered by TV Commercial:

In some embodiments the ambient audio will be monitored to detect when a certain advertising clip is broadcast. When this happens, an embodiment of the app will prompt users to view a video on their smartphone, which video might feature the same product as was on the broadcast and/or a related product (e.g., a broadcast clip about a men's razor my generate a video about razor blades, shaving cream, etc.). The video might appear automatically or only after a user grants permission (e.g., by clicking a button) for it to play.

As a further example, users who accept and view the entirety of the video clip might receive a bonus point or item for use in the current application, e.g., a video game. This offer is very appealing to advertisers and thus also valuable to application developers as it is possible to bill the advertiser for exactly the smartphone clip the user has actually consumed.

3. Quiz Triggered by TV Clip:

An advertisement clip showing in the background is detected here as in user stories 1 and In this variation, users will be prompted to take part in a quiz and respond to questions about the product that corresponds to the identified audio clip. Users who answer the questions (or certain of them) correctly will receive bonus points or items within the app. The advertiser will be invoiced for the successful delivery of the quiz.

Quiz questions and answers will be managed on the server and protected against fraud to reduce the chance that the invoicing system might be abused.

This variant is potentially even more valuable as compared with options 1 and 2 above, as customers have to prove they have certain knowledge of the product while only consumption will suffice for scenarios 1 and 2.

4. TV Channel Loyalty:

In this scenario the TV audio will be also analyzed as described previously. In this case, however, the customers will be rewarded if they remain tuned to the TV channel for a specified period time. For instance, they might receive bonus points for each successive 10 minute interval of a broadcast TV channel, which points could be exchanged for in-app content or items.

This scenario would be particularly appealing to use by TV channels (advertisers/marketers) as it allows them to precisely measure, promote, and improve customer retention.

5. Voting for Talent Shows, Etc.

This user story accomplishes a different type of customer loyalty: the adsync Tool displays a voting option at the correct moment when customers are playing a casual game on their smartphone and a talent show or comparable broadcast is showing in the background, so they can vote for their favorite talent. This generates a high degree of loyalty to the program format and rewards the users with bonus points or game items.

6. In-Game Banner Advertising

Another variant of scenario 1 ("banner display") above would be to position TV-synchronized advertising content directly within a game app. For example, advertisements in racing or ball games could be matched to the currently broadcast TV clip and be displayed on advertising banners (bill boards, etc.) within the game playing field just as they would be at a real-life live football game.

This way the banners are more likely to be accepted by the user and not perceived as annoying, thus raising the probability that they will be clicked on. As these banners are potentially more valuable to some advertisers than normal display banners the app developer could garner a higher ROI, which will then motivate them to integrate this technology into their game.

7. In-Game Quiz:

This variation is similar to that set out in scenario 6 above, where the basic principle is to integrate a product-specific quiz into the course of, for example, a role-playing game. In this embodiment users will be able to only navigate past a certain game obstacle if they correctly answer some questions about the products currently broadcast on TV to their virtual game partners.

Thus, the app user will be highly motivated to provide this information correctly and consequently truly understand the advertising message. As with scenario 6 the slightly higher effort pays off quickly for the app developers as providing such an in-game quiz is more valuable to them than an optional quiz that is not integrated into the game flow.

Of course, nothing in the foregoing is intended to limit multiple ones of the embodiments mentioned above to be included in a single App.

As an example of how an embodiment would work in practice, the following describes how a "Jump & Run" casual game would operate with adsync integration:

Example 1

The user launches the game and the app registers with the adsync server.

The user completes the first game level while the TV is on in the background.

The app activates the microphone of the smartphone and sends fingerprints to the server.

The server analyzes these fingerprints to determine whether they comply with the advertising events currently booked by the app. In the current example, it will be assumed that there is no matching audio at the moment because the weather report is currently being broadcast.

5 minutes later:

An advertising block is broadcast on the TV.

Using the adsync SDK the game app detects a Volkswagen advertisement.

Subsequently, a suitable VW advertisement is loaded from the server and prepared within the game. Corresponding to this the message "Do you want to learn more about the new VW Golf? Then click here and collect bonus points." Is displayed on the user's smart phone.

The user sees this and is interested in the new car or in collecting bonus points for the game, so he clicks on the claim. A landing page will be displayed showing that he has earned 10 bonus points, which will be credited to his game points.

The database of the advertiser notes that a landing page has been delivered successfully.

As an option the landing page may contain a "Call to Action" button that links to a lead generating page. Here it is possible to enter user details, e.g. to arrange a test drive.

15 minutes later:

In the meantime, assume that the user has reached level 3 of the game and a talent show is being broadcast on his TV.

A dialogue item is displayed on the user's device at the same time as the judges reveal their choice, prompting "Vote for your stars and earn bonus points!". The user will now be able to vote for a favorite candidate and promote that candidate further.

In this case, user will be credited with, say, 20 bonus points for this action and can use them to unlock a new tool that will help him advance within his game The advertiser (in this case the TV channel) sees in his adsync data that a voting was carried out.

The actual voting details are forwarded to the channel and are added to the total evaluation of the talent candidate.

The user continues his game . . . .

Some minutes later:

Adsync measures and stores what channels, formats and advertisements are being viewed by the user. A user profile will be created and regularly updated.

A Volkswagen advertising block starts on the TV.

The user switches the channel and therefore will not be viewing the entirety of the advertisement block.

Since adsync knows what advertisement is being broadcasted on the format/channel that has been viewed it is able to deliver now or even later, a suitable VW advertisement. All other interactions remain the same like with a fully synchronized TV spot.

Such TV targeted advertisement can be delivered at any time.

The user profile according to the TV viewing behavior allows international brands to precisely and effortless target their user group in each country. The adsync service automatically matches the delivery of mobile advertisement aligned within the same TV target group.

Turning next to a discussion of some technical features of an embodiment, adsync analyses audio input via a microphone of the mobile device. The TV audio broadcast received by the microphone is converted into small fingerprints by the smartphone that normalizes the volume levels and disturbances or the calculation is done on the remote server. These fingerprints are then compared to the fingerprints of a broadcast advertisement or a showing TV channel and consequently identified. Two possible ways these fingerprints are generated with the currently broadcast advertising clip are described below:

1. In-App Recognition:

With this approach the fingerprints of the advertising clip to be recognized are stored directly by the smartphone app or are downloaded once the app is launched. An advantage of this approach is that the running audio recognition does not incur data traffic or server load on behalf of the Tool. Thus, this procedure is ideally suitable for apps and events where a high proportion of on-off or long-term users are anticipated.

On the other hand this embodiment would be limited in some embodiments in that, if storage on the user's device is limited, only a (relatively) limited number of clips to be recognized, typically a few thousand. This procedure, however, may not be suitable for synchronization with live shows (e.g., real-time "talent shows", scenario 5 above) or for association with an entire TV channel (user scenario 4).

2. Remote Recognition:

This variation utilizes a remote server that will identify the audio associated with a fingerprint that has been detected on the user's device. This arrangement makes it possible for an embodiment to operate in real time during live broadcasts. It also would allow monitoring over longer periods of time. Remote recognition allows for all of the above-listed user scenarios to be reproduced.

On the other hand this approach will require a continuous data connection between the smartphone and the adsync server, which also generates a certain volume of data, which in some embodiments might be comparable to the data transmitted during a Skype phone call. The continuously active remote recognition also generates a load on the adsync servers, which can be reflected in the potential price and revenue model for the app developer.

An overview of the some important components of the adsync Client/Server architecture follows:

AdSync Server: HTTP-REST Tool for all server-side functions.

This Tool contains functions, including for

Developer registration and authentication

Advertising partner registration and authentication

App registration and authentication

Clip recognition via fingerprint

Banner delivery and billing

Video delivery and billing

Quiz delivery and billing

Bonus point schemes for app users

Server-based log report generation for advertising partners and app developers

Automatic load balancing for varying user access

AdSync mobile Tool: platform-independent Tool for iOS, Android and Windows Phone including all of the functions necessary to adsync in any app:

Contains the mobile counterpart to the server Tool

Contains additional modules for displaying banners, videos and quizzes/voting events In summary, various embodiment of the instant invention provide an efficient and open system and a way to step into new ground regarding the interactive approach to product marketing in the sector of mobile devices. Instead of more advertisements everywhere, the instant invention provides a framework usable by both developers of application for mobile devices and marketers looking to extend their product marketing campaign to the mobile sector in a exciting and approachable form. The implementation and participation in the instant system provides each participant benefits and only requires a minimal input of effort.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Of course, many modifications and extensions could be made to the instant invention by those of ordinary skill in the art. For example in one preferred embodiment the instant invention will allow multiple consumers to interact collaboratively to process data send from the server wherein a successful fulfillment provides more rewarding rewards to each consumer.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of wirelessly transmitting a message to a mobile computing device, said mobile computing device having a microphone integral thereto at least for sensing ambient audio, wherein is provided a host application and a predetermined target audio, comprising the steps of:
   (a) receiving in said mobile computing device a transmission of said host application, said host application having a primary function and a secondary function, wherein
      (i) said primary function is a user interactive application different from audio recognition, and
      (ii) said secondary function operates simultaneously in background along with said primary function to process ambient audio received through said microphone;
   (b) receiving within said mobile computing device a wireless transmission of a target audio fingerprint different from said target audio, calculated from said target audio, and based on said target audio characterizing parameters;

(c) activating said host application within said mobile computing device, thereby activating said primary and said secondary functions;

(d) within said mobile computing device,
   (i) using said microphone to receive within said mobile computing device a received audio signal from an audio source proximate to said mobile computing device;
   (ii) while a user interacts with said primary function, using said secondary function to continuously process said received audio signal as it is received to determine a received audio fingerprint of said received audio signal,
   (iii) continuing to process said received audio signal until said received audio fingerprint matches said target audio fingerprint, thereby identifying said target audio within said audio signal,
   (iv) after said target audio is identified, wirelessly transmitting to a central server an indication that said target audio has been identified,
   (v) after transmitting said indication that said target audio has been identified to said central server, receiving by said secondary function a message in reply from said central server within said mobile computing device,
   (vi) in response to said message in reply, at least partially interrupting said user's interaction with said primary function by said secondary function to display said message in reply to the user; and
   (vii) after said message in reply is displayed to the user, allowing the user to continue interacting with said primary function of said host application.

2. The method according to claim 1, wherein step (vii) comprises the step of:
   (1) after said message in reply is displayed to the user allowing the user to continue interacting with said primary function of said host application only after taking a required action.

3. The method according to claim 1, wherein step (vi) comprises the steps of:
   (1) in response to said message in reply, at least partially interrupting said user's interaction with said primary function by said secondary function to display said message in reply to the user using said mobile computing device, wherein said message contains an embedded Internet link to a predetermined website,
   (2) receiving a selection of said embedded Internet link from the user,
   (3) activating a browser function of said mobile computing device, and
   (4) displaying a web site associated with said embedded Internet link on the mobile computing device.

4. The method according to claim 1, wherein said mobile computing device is selected from the group consisting of a cell phone and a tablet computer.

5. The method according to claim 1, wherein said audio emitting source is a television and said audio signal is an audio portion of a television broadcast.

6. The method according to claim 1, wherein the audio emitting source is selected from the group consisting of a television, a radio, and a live concert.

7. A method of transmitting a message to a user having a mobile computing device, said mobile computing device having a microphone for sensing ambient audio integral thereto, wherein is provided a host application and a predetermined target audio, comprising the steps of:

(a) receiving in said mobile computing device said host application, said host application having a primary function and a secondary function, wherein
   (a) said primary function is an interactive application different from audio recognition, and
   (ii) said secondary function operates simultaneously in background along with said primary function to recognize ambient audio through said device microphone;
(b) receiving within said mobile computing device a fingerprint of said target audio wirelessly transmitted from a central server, said fingerprint of said target audio being calculated from said target audio, different from said target audio and based on said target audio characterizing parameters;
(c) activating said host application within said mobile computing device, thereby activating said primary and said secondary functions;
(d) using said microphone of said mobile computing device to receive an audio portion of a television broadcast emitted from a television situated proximate to said mobile computing device while the user interacts with said primary function;
(e) while a user interacts with said primary function, using said secondary function to continuously process said received audio portion of said television broadcast as it is received to determine a received audio fingerprint of said received audio portion of said television broadcast until said received audio fingerprint matches said target fingerprint;
(f) if said received fingerprint matches said target fingerprint,
   (f1) using said host application secondary function to wirelessly transmit to said central server an indication that said target audio has been identified within the audio portion of the television broadcast;
   (f2) after said indication has been transmitted to said central server, receiving within said mobile computing device by said secondary function a message from said central server in response to said transmission of said indication;
   (f3) after said message in response is received, at least partially interrupting said user's interaction with said primary function by said secondary function to display said message in response to the user;
   (f4) after said message in response is displayed, allowing the user to continue interacting with said primary function after said message is displayed; and
(g) if said received fingerprint does not match said target fingerprint, allowing the user to continue using said primary function.

8. The method according to claim 7, wherein step (f4) comprises the step of:
   (f4) after said message in response is displayed, allowing the user to continue interacting with said primary function only ater taking a required action.

9. The method according to claim 7, wherein step (f3) comprises the steps of:
   (i) ater said message in response is received, at least partially interrupting said user's interaction with said primary function by said secondary function to display said message in response to the user, wherein said message in response contains an embedded Internet link to a predetermined website,
   (ii) receiving a selection of said embedded Internet link from the user, (iii) activating a browser function of said mobile computing device in response to said user selection, and (iv) displaying a web site associated with said embedded Internet link on the mobile computing device.

10. The method according to claim 7, wherein said mobile computing device is selected from the group consisting of a cell phone and a tablet computer.

11. A method of transmitting a message to a user having a mobile computing device, said mobile computing device having a microphone for sensing ambient audio integral thereto, wherein is provided a host application and a predetermined target audio, comprising the steps of:

(a) receiving within said mobile computing device said host application, said host application having a primary function and a secondary function, wherein (i) said primary function is a user interactive application different from audio recognition, and (ii) said secondary function operates simultaneously in background along with said primary function to recognize ambient audio received through said device microphone;

(b) receiving within said mobile computing device a wireless transmission of a fingerprint of said target audio, said fingerprint of said target audio being calculated from said target audio, different from said target audio and based on said target audio characterizing parameters;

(c) activating by a user said host application within said mobile computing device, thereby activating said primary and said secondary functions;

(d) activating an audio emitting source proximate to said mobile computing device, said audio emitting source emitting an audible signal receivable by said microphone;

(e) continuously receiving said audible signal by said microphone;

(f) while the user interacts with said primary function, using said secondary function to continuously process said received audible signal as it is received to determine an audible signal fingerprint;

(g) continuing to process said received audible signal as it is received until said determined audible signal fingerprint matches said target audio fingerprint;

(h) after said received audible signal fingerprint is determined to match said target audio fingerprint, (h1) using said secondary function to transmit to a central server an indication that said target audio has been identified within said audible signal;

(h2) after said secondary function has transmitted said indication to said central server, receiving by said secondary function in response to said transmitted indication a transmission of a message from said central server;

(h3) interrupting the user's interaction with said primary function by said secondary function to display said message to the user; and (h4) after said message is displayed to the user, requiring the user to respond to said displayed message before the user can resume interacting with said primary function.

12. The method according to claim 11, wherein said mobile computing device is selected from the group consisting of a cell phone and a tablet computer.

13. The method according to claim 11, wherein the audio emitting source is selected from the group consisting of a television, a radio, and a live concert.

14. The method according to claim 11, wherein the primary function is a function to access email, an Internet browser, a game, or a news reader.

15. The method according to claim 11, wherein said target audio is an advertisement for a product and said message displayed to the user is a reward associated said product.

16. The method according to claim 1 wherein said target audio characterizing parameters comprise one or more of a zero crossing rate, a tempo, long term spectral characteristics, short term spectral characteristics, average spectral values, a pitch, a key, a listing of instruments present in the audio, a long term frequency bandwidth, a short term frequency bandwidth, whether vocals are present or not, and whether the target audio comprises music, vocals and music, or spoken words.

17. The method according to claim 7 wherein said target audio characterizing parameters comprise one or more of a zero crossing rate, a tempo, long term spectral characteristics, short term spectral characteristics, average spectral values, a pitch, a key, a listing of instruments present in the audio, a long term frequency bandwidth, a short term frequency bandwidth, whether vocals are present or not, and whether the target audio comprises music, vocals and music, or spoken words.

18. The method according to claim 11 wherein said target audio characterizing parameters comprise one or more of a zero crossing rate, a tempo, long term spectral characteristics, short term spectral characteristics, average spectral values, a pitch, a key, a listing of instruments present in the audio, a long term frequency bandwidth, a short term frequency bandwidth, whether vocals are present or not, and whether the target audio comprises music, vocals and music, or spoken words.

* * * * *